US 8,200,944 B2

(12) United States Patent
Lee et al.

(10) Patent No.: US 8,200,944 B2
(45) Date of Patent: Jun. 12, 2012

(54) METHOD FOR INSTRUCTION PIPELINING ON IRREGULAR REGISTER FILES

(75) Inventors: Jenq Kuen Lee, Hsinchu (TW); Ling Hua Tseng, Hsinchu (TW); Chung Kai Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 442 days.

(21) Appl. No.: 12/490,932

(22) Filed: Jun. 24, 2009

(65) Prior Publication Data

US 2010/0037037 A1 Feb. 11, 2010

(30) Foreign Application Priority Data

Aug. 6, 2008 (TW) .............................. 97129768 A (51) Int. Cl.
*G06F 9/30* (2006.01)
*G06F 9/40* (2006.01)

(52) U.S. Cl. ...................................... 712/216; 712/215

(58) Field of Classification Search .................. 712/216, 712/215
See application file for complete search history.

(56) References Cited

OTHER PUBLICATIONS

Chen et al., "Enabling Compiler Flow for Embedded VLIW DSP Processors with Distributed Register Files", Jun. 2007.*

* cited by examiner

*Primary Examiner* — Eddie P Chan
*Assistant Examiner* — Jesse R Moll
(74) *Attorney, Agent, or Firm* — WPAT, P.C.; Anthony King (57) ABSTRACT

A method for pipelining instructions on a PAC processor includes determining a minimum initial interval, and grouping the instructions so that the operands of dependent instructions are assigned to the same local register file. The virtual registers of the instructions that have data dependency across the first functional unit and the second functional unit are assigned to a global register file. The instructions are then modulo scheduled based on a current value of initial interval. The virtual registers of the scheduled instructions are allocated to the corresponding register files. If the allocation fails, a set of virtual registers is transferred from the first or second register file to the global register file.

8 Claims, 7 Drawing Sheets

METHOD FOR INSTRUCTION PIPELINING ON IRREGULAR REGISTER FILES

BACKGROUND OF THE INVENTION (A) Field of the Invention

The invention relates to the field of optimizing compilers for computer systems, and more particularly, to the field of optimizing compilers for processors with irregular register files.

(B) Description of the Related Art

Figure 1:
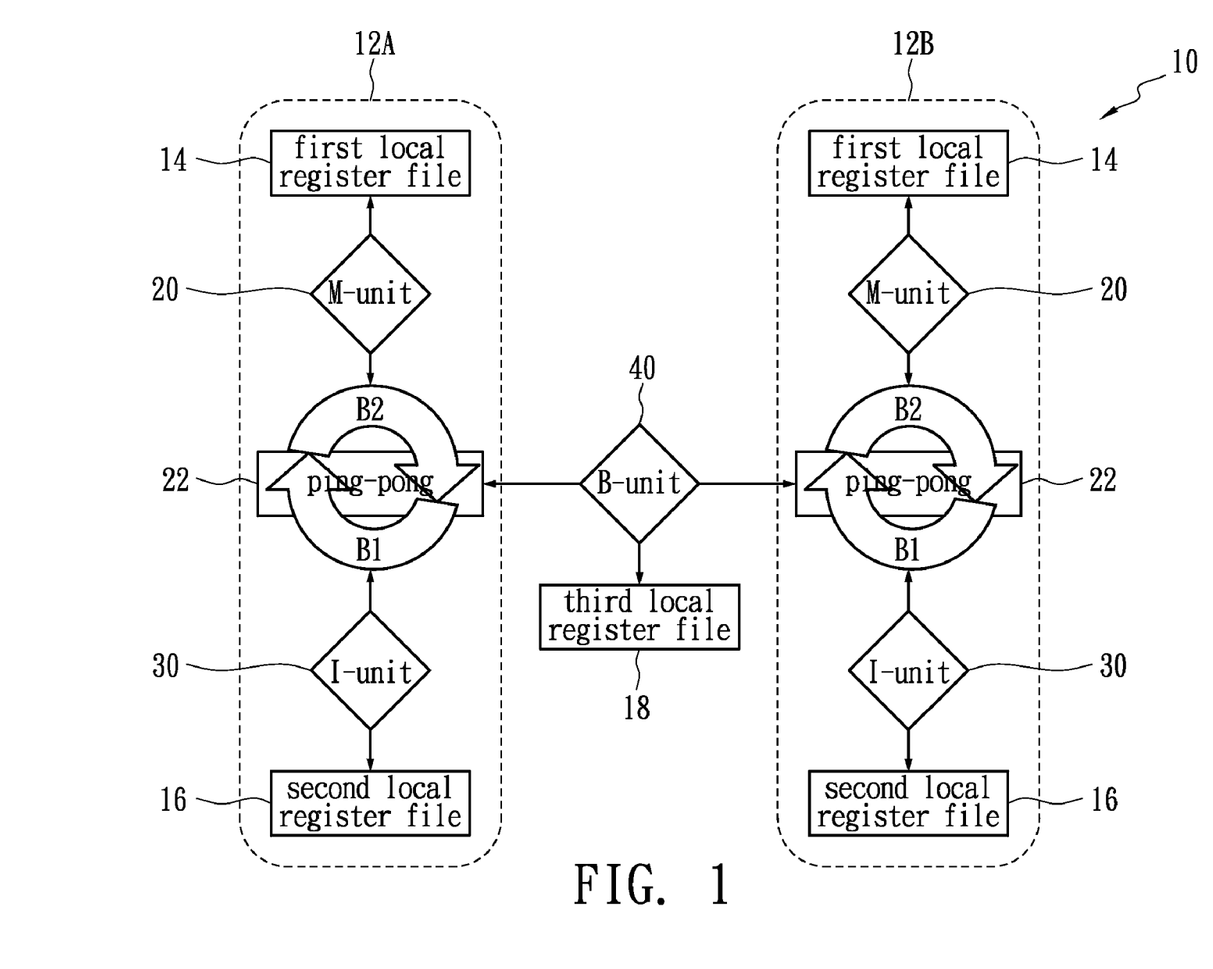
FIG. 1 illustrates the architecture of a PAC processor.

It is desirable that computer programs be as efficient as possible in their execution time and memory usage. This need has spawned the development of computer architectures capable of executing target program instructions in parallel. A recent trend in processor design is to build processors with increasing instruction issue capability and many functional units. For example, architecture of Parallel Architecture Core (PAC) 10 shown in FIG. 1 illustrates a five-way issue DSP. The PAC processor 10 comprises a first cluster 12A and a second cluster 12B, wherein each cluster 12A or 12B comprises a first functional unit 20, a second functional unit 30, a first local register file 14 connected to the first functional unit 20, a second local register file 16 connected to the second functional unit 30, and a global register file 22 having a ping-pong structure formed by a first register bank B1 and a second register bank B2. Each register file includes a plurality of registers. Also, the PAC processor 10 comprises a third functional unit 40, which is placed independently and outside the first cluster 12A and the second cluster 12B. A third local register file 18 is connected to the third functional unit 40. The first functional unit 20 is a load/store unit (M-Unit), the second functional unit 30 is an arithmetic unit (I-Unit), and the third functional unit 40 is a scalar unit (B-unit). The third functional unit 40 is in charge of branch operations and also capable of performing simple load/store and address arithmetic. The global register files 22 are used to communicate across clusters 12A and 12B. Only the third functional unit 40, being able to access all global register files 22, is capable of executing such copy operations across clusters 12A and 12B. The first local register file 14, the second local register file 16, and the third local register file 18 are only accessible by the M-Unit 20, I-Unit 30, and B-Unit 40, respectively. Each global register file 22 has only a single set of access ports, shared by the M-Unit 20 and I-Unit 30. Each register bank B1 or B2 of the global register file 22 can only be accessed by either the first functional unit 20 or the second functional unit 30 in an operation cycle, so these two functional units 20, 30 can only access different banks B1 or B2 in each operation cycle. This is an access constraint of the ping-pong structure.

Figure 2:
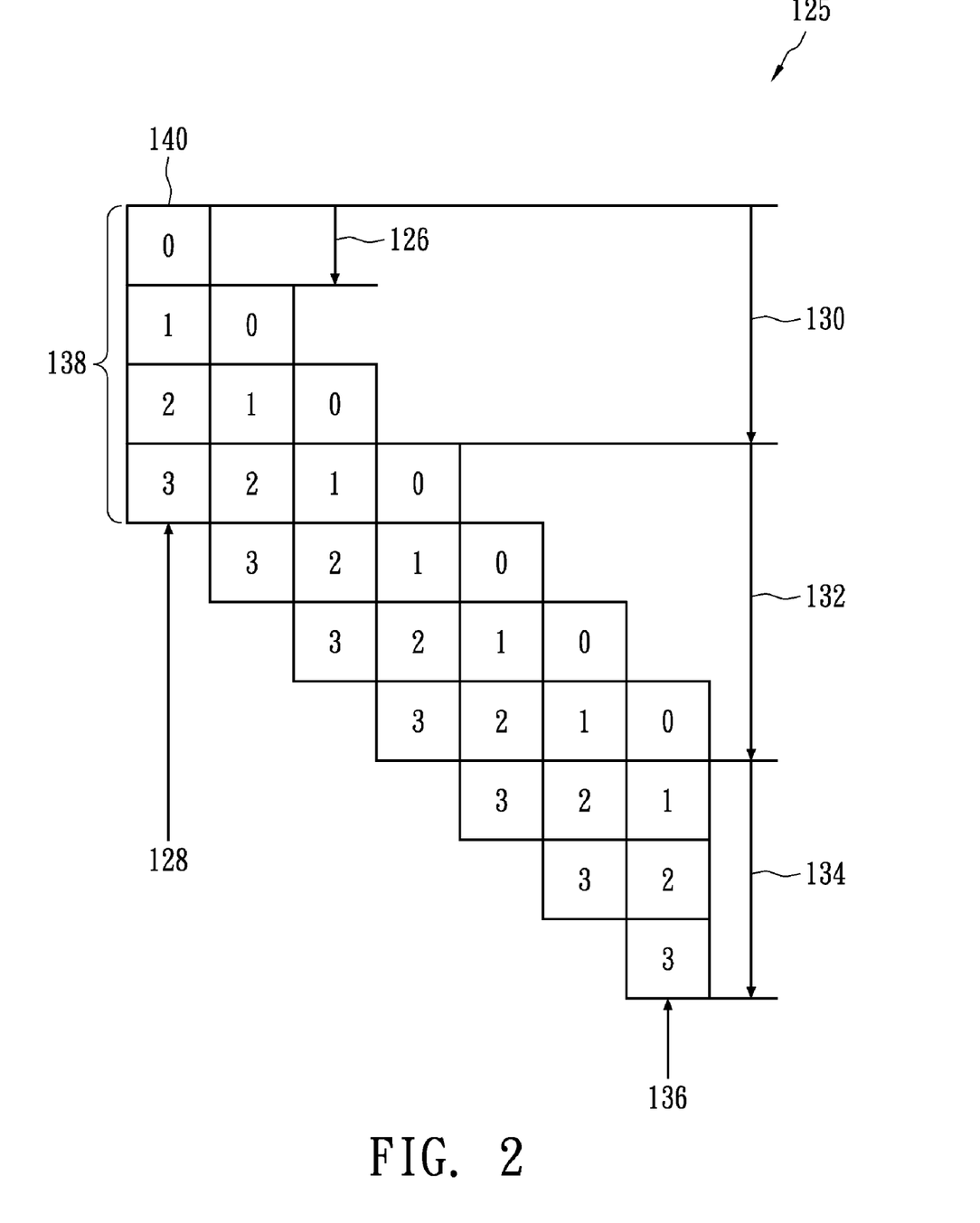
FIG. 2 illustrates a modulo scheduling scheme in software pipelining.

The process of optimizing a target program's execution speed centers on scheduling the execution of the target program instructions to take advantage of the multiple computing resource units. One strategy of optimization is to focus on loops in code, where in many applications the majority of execution time is spent. Software pipelining (SWP) is a loop optimization technique for PAC architectures. By overlapping the execution of the loop body, SWP increases the instruction-level parallelism (ILP) thus maximizing the performance of PAC architectures. FIG. 2 illustrates a software pipelining scheme called modulo scheduling. Parallel instruction processing is obtained by starting an iteration of fixed time intervals (II). The scheduled length of a single iteration is TL 138, and the iteration is divided into stages of length II 126. Loop execution begins with stage 140 of the first iteration 128. During the first II cycles, no other iteration executes concurrently. After the first II cycles, the first iteration 128 enters Stage 1, and the second iteration 136 enters Stage 0. New iterations begin every II cycles until a state is reached when all stages of different iterations are executing. Toward the end of loop execution, no new iterations are initiated, and those that are in various stages of progress gradually complete. Three phases of loop execution are termed the prologue 130, the kernel 132 and the epilogue 134. Since smaller II values imply higher throughput, almost all scheduling techniques attempt to derive a schedule that minimizes the II value. After reaching a valid schedule, the registers of the scheduled instruction are allocated to the register file. Since the execution of loop iteration is overlapping, and the accessibility of the global register file is limited, the process of pipelining loop instructions becomes more complicated.

SUMMARY OF THE INVENTION

A method of pipelining instructions is provided. The instructions of a target program are executed at a target computer architecture having a first cluster, a second cluster and a scalar unit. Each cluster comprises a first functional unit, a second functional unit, a first local register file connected to the first functional unit, a second local register file connected to the second functional unit, and a global register file having a ping-pong structure formed by a first register bank and a second register bank. The method begins with determining a minimum initial interval (MII). The instructions which are performed on the same functional unit are grouped, based on a data dependency graph and a modulo reservation table (MRT), so that the operands of dependent instructions are assigned to the same local register file. The virtual registers of the instructions that have data dependency across the first functional unit and the second functional unit are assigned to the global register file. The instructions are then modulo scheduled based on a current value of initial interval (II). If no valid schedule for the current II is found, the II is adjusted and the steps of grouping instructions and assigning virtual registers to global registers are performed again. The virtual registers of the scheduled instructions are allocated into the corresponding register files. If the allocation step fails in the first iteration, a set of virtual registers from the first or second register file are transferred to the global register file. After transferring the virtual register, if the allocation step fails again, II is increased and the steps of grouping instructions, assigning virtual registers, modulo scheduling, and register allocation will be performed again.

In another aspect of the present invention, a computer readable medium having computer readable program code is provided. The readable program code is embedded in the medium for scheduling multiple groups of instructions in a computer program for execution on a processor, wherein the processor comprises a first functional unit, a second functional unit, a first local register file connected to the first functional unit, a second local register file connected to the second functional unit, and a global register file having a ping-pong structure formed by a first register bank and a second register bank. The computer readable program code includes a portion for determining a minimum initial interval (MII), and a portion for grouping the instructions by associated functional units based on a data dependency graph and a modulo reservation table (MRT) so that the operands of dependent instructions are assigned to the same local register file. The computer readable program code also comprises a portion for assigning the virtual registers of the instructions which have data dependency across the first functional unit and the second functional unit to the global register file, a portion for modulo scheduling, a portion for registering allocations, and a portion for transferring a set of virtual registers from a local register file to a global register file.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 3:
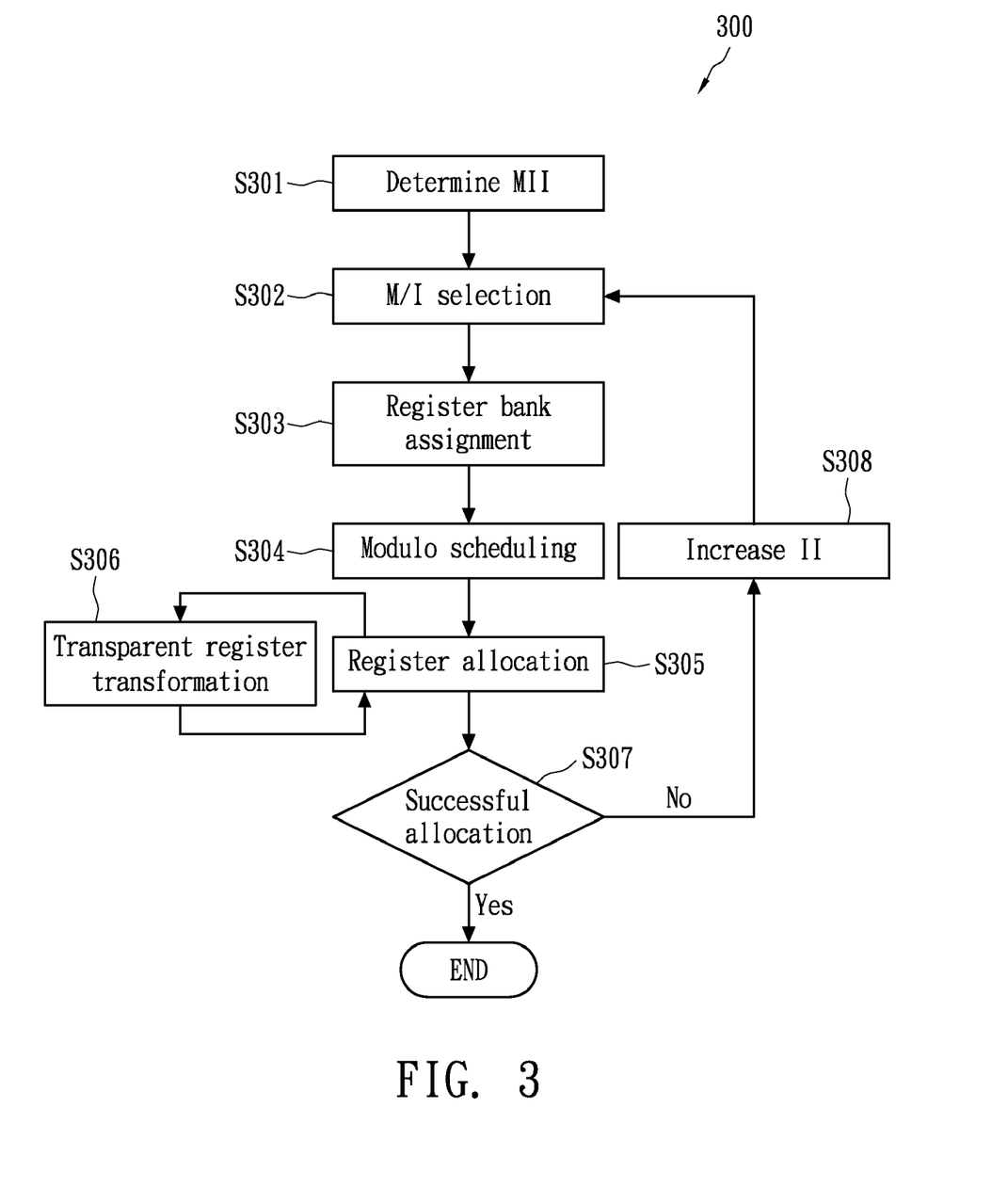
FIG. 3 shows a flow chart of software pipelining method according to an embodiment of the invention.

The core of software pipelining is modulo scheduling and register allocation. However, the consequent restrictions on register accessing will in turn interfere with the modulo scheduling. Thus the register allocation should be performed with careful consideration. FIG. 3 shows a flow chart of a software pipelining method 300 according to an embodiment of the invention. The method 300 includes a modulo scheduling step S304 and three phases, steps S302, S303 and S306, related to register allocation.

In greater detail, the method 300 begins with determining a minimum initial interval (MII) in step S301, seeking a valid schedule in step S304 and adjusting the II limitation if no valid schedule is found. The MII is determined by selecting the larger of a resource bound and a recurrence count, wherein the resource bound (ResMII) is related to the total resource requirement and the recurrence count (RecMII) is related to the data dependencies of the target program. If no valid schedule can be arranged under the M11, the II value will be increased and another iteration executed to try to find a valid schedule. The process repeats until a valid schedule is found or II exceeds a preset boundary.

Figure 4A:
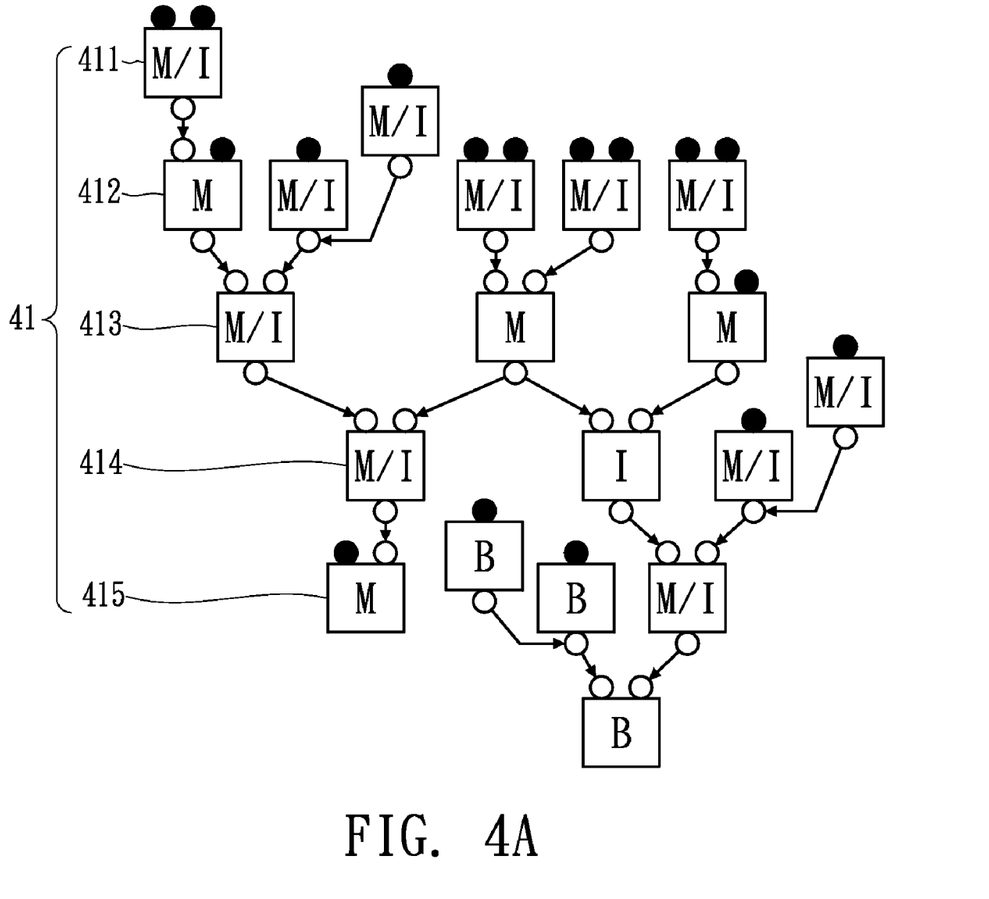
FIGS. 4A through 4C illustrate the steps of grouping the instructions.
Figure 4B:
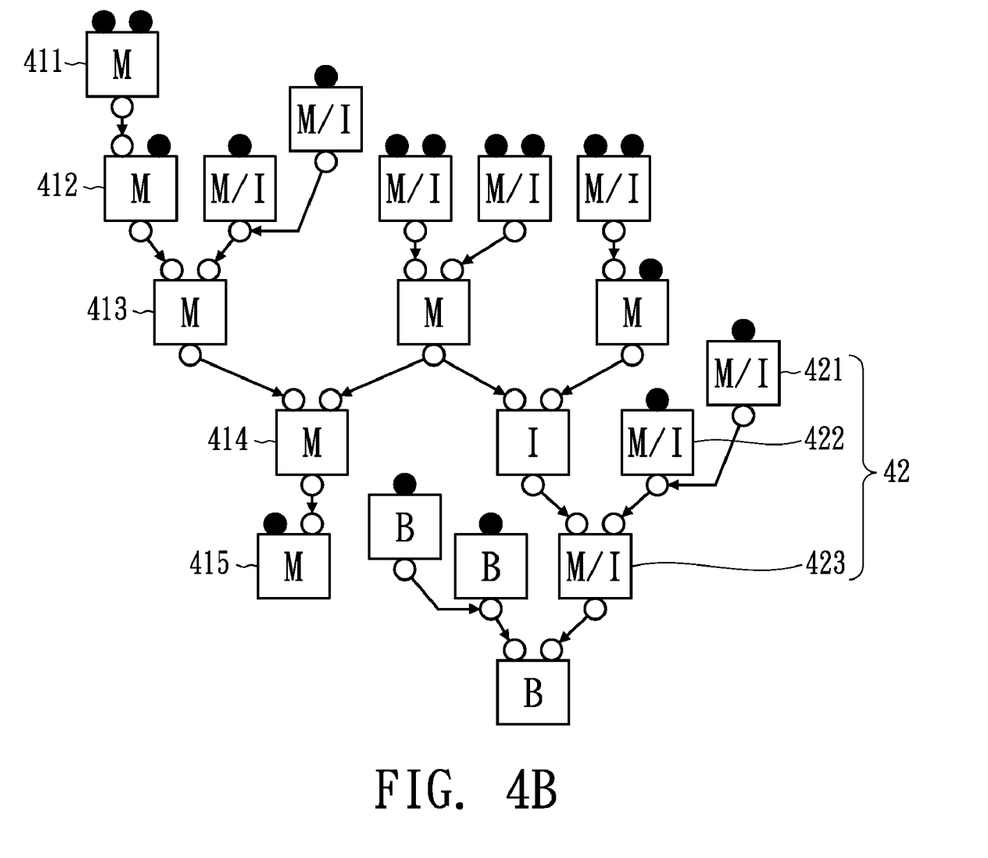
Figure 4C:
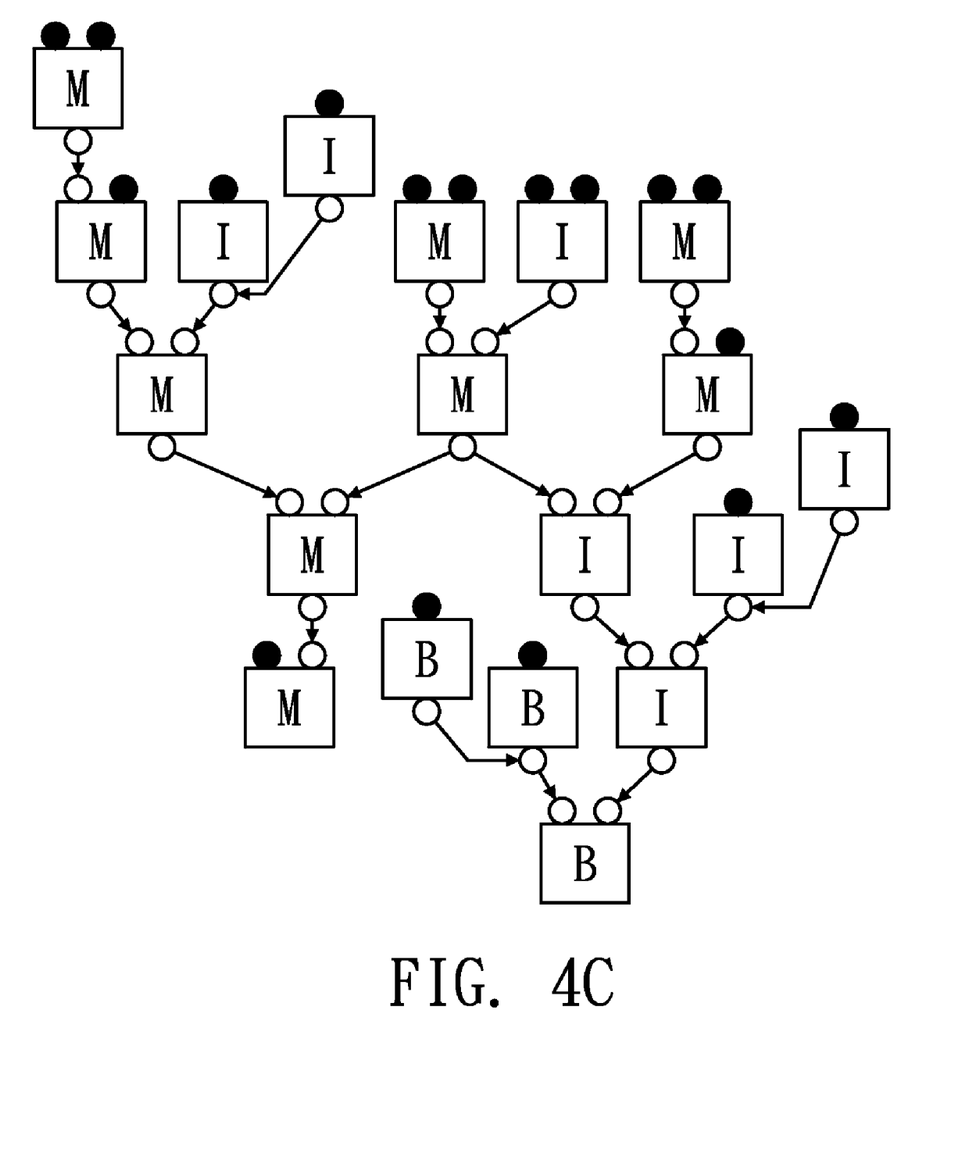

In step S302, the instructions which are performed on the same functional unit are grouped together based on a data dependency graph and a modulo reservation table (MRT), so that the operands of dependent instructions are assigned to the same local register file. For better comprehension, FIG. 4A-4C illustrate the steps of instruction grouping on the application of Very Long Instruction Word (VLIW) architecture. The grouping step S302, however, is not limited to the following example, and grouping instructions on hardware with distributed register files are within the scope of the invention. In FIG. 4A, a data dependency graph of loop bodies is presented. Each vertex presents an instruction, and the letter labeled in each vertex represents the functional unit that executes the instruction. For example, label B represents the instruction can be performed by the B-unit, and label M/I represents the instruction can be operated by either the M-unit or the I-unit. Each arc represents a data flow. First, a longest path 41 is selected, and the vertexes along the path, 411-415, are labeled as M, as shown in FIG. 4B. The vertexes labeled M means that those vertexes are performed by the M-unit, and the virtual registers (shown as white circles) along the path 41 are assigned to the first local register file. Next, the second longest path 42 including vertexes 421-423 is selected with I-unit, to balance the workload of the two functional units, as shown in FIG. 4B. In order to balance the assignments to M-unit and I-unit, the M vertexes and the I vertexes are grouped in turn. The grouping step proceeds until all the vertexes are labeled, as shown in FIG. 4C. One instruction will be classified to only one group, and each instruction will be grouped to one group; in other words, each vertex is labeled with only one letter.

Figure 4D:
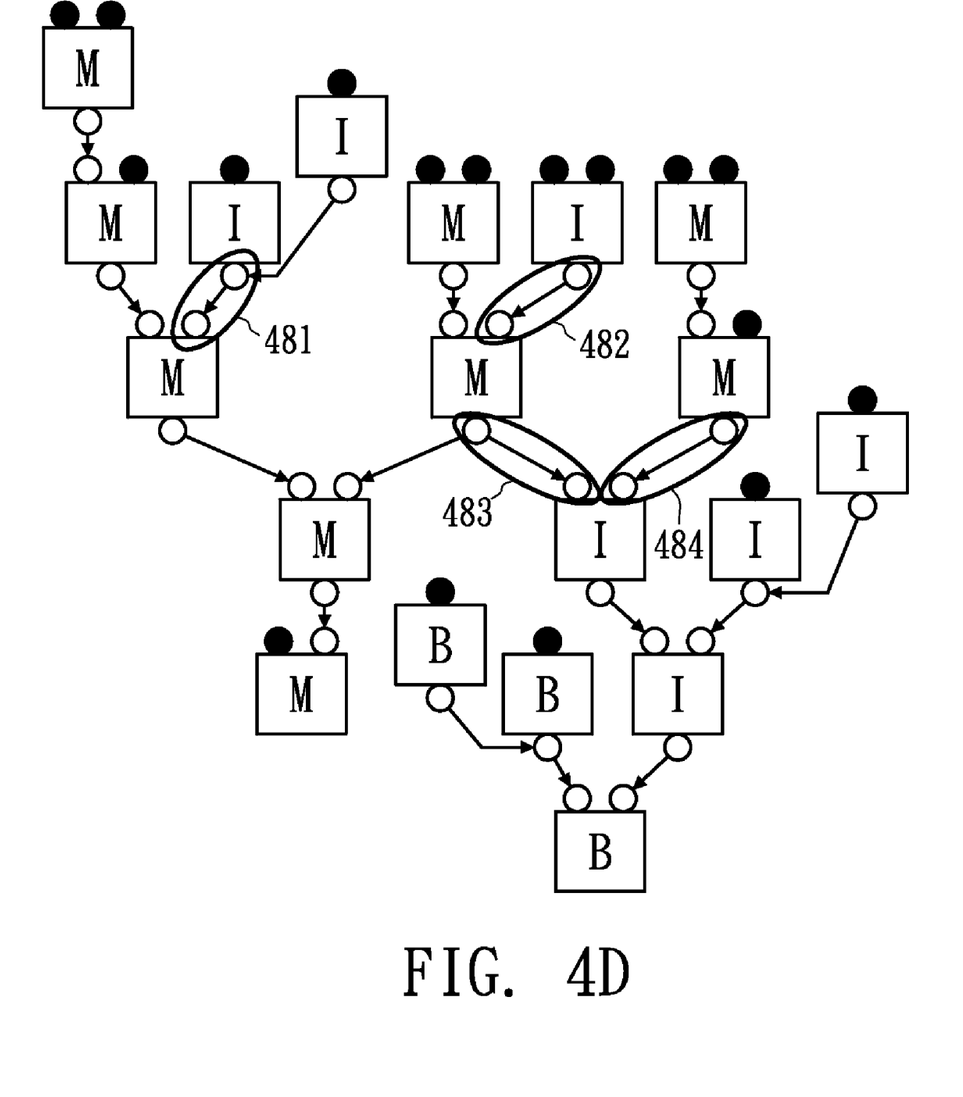
FIG. 4D shows that the virtual registers which have data dependency across the first functional unit and the second functional unit are assigned to a global register.

In step S303, each virtual register having the data dependency across the first functional unit and the second functional unit is assigned to the global register file, as represented by the arcs 481-484 shown in FIG. 4D. The data dependency on M-units and I-units is further illustrated by the following instruction set:

| M-unit | I-unit |
|---|---|
| LW d0, sp, 40 | nop |
| nop | nop |
| nop | nop |
| nop | MAC ac1, d0, ac0 |

In this example, a multiply-and-accumulate instruction (MAC) is executed after a load instruction (LW), and one common variable d0 is used. The global register will be accessed by M-unit and I-unit in succession. In order to prevent inserting a copy instruction between the load instruction and the MAC instruction, the variable d0 is allocated to the global register file.

In step S305, the virtual registers of the scheduled instructions are allocated to the corresponding register files. In step S306, a set of virtual registers is transferred from the first or second local register file to the global register file if the allocation step S305 fails. In other words, when there are unallocated virtual registers but the local register files are full, the set of transferable virtual registers will be moved. To transfer the virtual register from the local register file to the global register file, the capacity of the local register is recorded. The capacity of the first/second local register file is decreased by 1 when a virtual register is allocated in the first/second local register. The set of transferable virtual registers are the operands that are used and defined by the same functional unit and also the operands that are defined or used and then assigned to a same register bank. A transparent register transformation (TRT) table is constructed to record the transferable virtual registers and the corresponding scores. For example, Table 1 shows an example TRT table.

TABLE 1

Transparent Register Transformation (TRT) Table

| Register File | Transferable TNs |
|---|---|
| First local register file | {(TN373, 7.0), (TN384, 5.84), (TN383, 1.2)} |
| Second local register file | {(TN 374, 4.15), (TN 380, 2.73)} |

In step S306, if the capacity of the first local register is zero, a transferable virtual register having the highest score in the TRT table of the first local register is transferred to the global register. If the capacity of the second local register is zero, a transferable virtual register having the highest score in the TRT table of the second local register is transferred to the global register. The scores of transferable virtual registers are calculated by the following formula:

(1) increasing the score by 4 if the capacity of the first or second local register file is increased by 1 after transferring the virtual register from the first or second local register file to the global register file;

(2) increasing the score by 2 if the capacity of the global register file does not increase after transferring the virtual register from the first or second local register file to the global register file; and (3) increasing the score by a fraction according to the reusability of the virtual register, wherein the fraction is a normalized figure by considering all the reusability of the virtual registers in the TRT table.

After transferring virtual registers, the operands of the scheduled instructions are allocated into the corresponding register files again. Step S307 checks whether the allocation step S305 fails. If so, the II value is increased a certain amount in step 308 and step S302-S304 will be performed again until a valid schedule is found or II exceeds a preset boundary.

The above-described embodiments of the present invention are intended to be illustrative only. Numerous alternative embodiments may be devised by those skilled in the art without departing from the scope of the following claims.

What is claimed is:

1. A method of pipelining instructions of a target program executed at a target computer architecture having a first cluster and a second cluster, each cluster comprising a first functional unit, a second functional unit, a first local register file connected to the first functional unit, a second local register file connected to the second functional unit, and a global register file having a ping-pong structure formed by a first register bank and a second register bank, the method comprising steps of:

(a) determining a minimum initial interval (MII);

(b) grouping the instructions which are performed on the same functional unit based on a data dependency graph and a modulo reservation table (MRT) so that the operands of dependent instructions are assigned to the same local register file;

(c) assigning the virtual registers of the instructions that have data dependency across the first functional unit and the second functional unit to the global register file;

(d) modulo scheduling the instructions based on a current value of initial interval (II), increasing the II and repeating steps (a), (b) and (c) if no valid schedule for the current II is found;

(e) allocating the virtual registers of the scheduled instructions into the corresponding register files;

(f) transferring a set of virtual registers from the first or second register file to the global register file if step (e) fails on a first iteration; and (g) repeating step (e) and increasing the current II if step (e) fails again;

wherein the step (f) further comprises steps of:
collecting a set of transferable virtual registers, wherein the transferable virtual registers are the operands used and defined by the same functional unit and assigned to a same bank;
constructing a transparent register transformation (TRT) table, wherein the TRT table records the transferable virtual registers and the corresponding scores;
transferring a transferable virtual register having the highest score in the TRT table from the first local register to the global register if the capacity of the first local register is zero; and
transferring a transferable virtual register having the highest score in the TRT table from the second local register to the global register if the capacity of the second local register is zero.

2. The method of claim 1, wherein step (a) comprises the steps of:
determining a resource bound (ResMII) according to a total resource requirement of the target program;
determining a recurrence count (RecMII) according to the data dependency graph; and
selecting the larger of the RecMII and the RecMII as the MII.

3. The method of claim 1, wherein step (b) comprises steps of:
(b1) obtaining the data dependency graph and the MRT;
(b2) selecting one functional unit, determining a longest path with the selected functional unit, and grouping the longest path by unifying the labels of selected vertexes;
(b3) selecting another functional unit, determining a longest path with the selected functional unit among all the un-grouped vertexes and grouping the longest path by unifying the labels of the selected vertexes; and
(b4) repeating steps (b2) and (b3) until each vertex of the data dependency graph is selected.

4. The method of claim 1, wherein step (e) comprises steps of:
constructing the capacity of the first and second local register files;
decreasing the capacity of the first local register files by 1 when a virtual register is allocated in the first local register file; and
decreasing the capacity of the second local register file by 1 when a virtual register is allocated in the second local register.

5. The method of claim 1, wherein the score of each transferable virtual register is calculated by:
increasing the score by 4 if the capacity of the first or second local register file is increased by 1 after transferring the virtual register from the first or second local register file to the global register file;
increasing the score by 2 if the capacity of the global register file is not increased after transferring the virtual register from the first or second local register file to the global register file; and
increasing the score by a fraction according to the reusability of the virtual register, wherein the fraction is a normalized figure considering all the reusability of the virtual registers in the TRT table.

6. The method of claim 1, wherein the first functional unit is a load/store unit.

7. The method of claim 1, wherein the second functional unit is an arithmetic unit.

8. A non-transitory computer readable medium having computer readable program code embedded in the medium for scheduling multiple groups of instructions in a computer program for execution on a processor, said processor comprising a first functional unit, a second functional unit, a first local register file connected to the first functional unit, a second local register file connected to the second functional unit, and a global register file having a ping-pong structure formed by a first register bank and a second register bank, the computer readable program code including:
(a) code for determining a minimum initial interval (MII);
(b) code for grouping the instructions by associated functional units based on a data dependency graph and a modulo reservation table (MRT) so that the operands of dependent instructions are assigned to the same local register file;
(c) code for assigning the virtual registers of the instructions that have data dependency across the first functional unit and the second functional unit to the global register file;
(d) code for modulo scheduling the instructions based on a current value of II, increasing the II and repeating codes (a), (b) and (c) if no valid schedule for the current II is found;
(e) code for allocating the virtual registers of the scheduled instructions into the corresponding register files;
(f) code for transferring a set of virtual registers from the first or second register file to the global register file and allocating the virtual registers of the scheduled instructions into the corresponding register files if allocating the virtual register fails on the first iteration; and
(g) code for increasing the II and modulo scheduling the instructions if the allocation operand fails again;

wherein the code in (f) further comprises of:
  code for collecting a set of transferable virtual registers, wherein the transferable virtual registers are the operands used and defined by the same functional unit and assigned to a same bank:
  code for constructing a transparent register transformation (TRT) table, wherein the TRT table records the transferable virtual registers and the corresponding scores;
  code for transferring a transferable virtual register having the highest score in the TRT table from the first local register to the global register if the capacity of the first local register is zero; and
  code for transferring a transferable virtual register having the highest score in the TRT table from the second local register to the global register if the capacity of the second local register is zero.

* * * * *